United States Patent [19]
Norton-Wayne

[11] Patent Number: 5,315,666
[45] Date of Patent: May 24, 1994

[54] METHOD AND APPARATUS FOR MEASURING LENGTHS ON AN ARTICLE

[75] Inventor: Leonard Norton-Wayne, Leicester, United Kingdom

[73] Assignee: De Montfort University, The Gateway, England

[21] Appl. No.: 703,359

[22] Filed: May 21, 1991

Related U.S. Application Data

[63] Continuation of Ser. No. 295,433, Jan. 10, 1989, abandoned.

Foreign Application Priority Data

Jan. 12, 1988 [GB] United Kingdom ............... 8800570

[51] Int. Cl.$^5$ ............... G06K 9/00; G06K 9/20
[52] U.S. Cl. ........................... 382/8; 382/1; 382/48
[58] Field of Search ............ 382/1, 8, 48; 364/470, 364/560, 561; 356/383, 384, 401; G06K 9/00, 9/20

[56] References Cited

U.S. PATENT DOCUMENTS

| | | | |
|---|---|---|---|
| 4,435,837 | 3/1984 | Abernathy | 382/41 |
| 4,790,023 | 12/1988 | Matsui et al. | 382/8 |
| 4,807,143 | 2/1989 | Matsuura | 364/470 |
| 4,901,359 | 2/1990 | Bruder | 382/8 |
| 4,982,437 | 1/1991 | Lariot | 382/8 |

*Primary Examiner*—Jose L. Couso
*Attorney, Agent, or Firm*—Charles E. Baxley

[57] ABSTRACT

A method and apparatus measure lengths on an article such as a garment by arranging the article in a field of view of an imaging device, e.g. a video camera forming a pixel image in an x-y array, identifying measurement points on the pixel image in terms of x and y coordinates of the array and evaluating actual lengths between identified measurement points by carrying out for example in a computer appropriate Pythagorean calculations based on the the coordinates and modified to correct for scale and system distortions. Measurement points can be identified by marking the article. The method and apparatus are of use for example in the measurement of shrinkage.

22 Claims, 1 Drawing Sheet

METHOD AND APPARATUS FOR MEASURING LENGTHS ON AN ARTICLE

This is a continuation of application Ser. No. 295,433, filed Jan. 10, 1989, abandoned.

BACKGROUND TO THE INVENTION

This invention relates to measuring articles. The invention is particularly, but not exclusively, concerned with measuring articles which are flexible and can be laid flat, and especially textile articles.

It is, of course, a simple task to measure a textile article using a flexible tape measure, but there are occasions when many similar articles have to be measured and manual measurement using a tape measure is time-consuming and tedious with the possibility of error. One such occasion arises in the testing of shrinkage, where a batch of garments is measured repeatedly after laundering treatments. It is clearly essential for such testing that reasonably accurate measurements be made of small length differences on articles where the points between which measurement are to be made are not necessarily well defined.

Such a situation suggests automatic rather than manual measurement. However, no satisfactory method for automatic measuring of flexible articles such as garments which have inherently complicated shapes has hitherto proved practicable.

The present invention provides a measuring method which can be more or less automated with savings in time and expense and which will yield accurate measurements which can be automatically recorded.

BRIEF DISCLOSURE OF THE INVENTION

The invention comprises a method for measuring an article comprising the steps of
  (a) arranging the article for measurement in a field of view of an imaging device which forms a pixel image in an x-y array,
  (b) forming by said imaging device a pixel image of the so arranged article,
  (c) identifying measurement points on said pixel image in terms of x and y coordinates of said array, and
  (d) evaluating actual lengths between identified measurement points on said article by carrying out appropriate Pythagorean calculations based on said x and y coordinates and modified to correct for scale and system distortions.

In addition to lengths between identified measurement points, of course, actual lengths may be evaluated between points which are derived from specifically identified measurement points.

The said imaging device may comprise a video camera or two dimensional charge coupled device (CCD).

The imaging device may produce successive images or "frames" and image capture or frame grabbing and framestore devices may be used to capture and store one of said successive images. Such image may be digitised for computing purposes.

The pixel image may be a silhouette image. An encoded description of the edge of the silhouette image may be derived directly from the imaging device and stored in random access memory of a computer programmed to carry out the said Pythagorean calculations.

Measurement points may be identified automatically with respect to features of the image. Said features may include the centroid of the image, edges and corners of the image. Such features may be identified by edge and corner finding techniques which may be known per se.

Measurement points may also be identified by marking the article, as by point light sources placed on it prior to forming said pixel image, which may comprise incandescent filament bulbs or reflectors.

Measurement points may also be identified by indicating their positions on the image, as by light pen means or by tracker ball or "mouse" means.

Particularly with silhouette images of garments, for example, "internal" measurement points marking, say, the apex of a V-neck or a change of texture, e.g. where ribbing begins, can be identified in any of these ways.

However measurement points are identified physically, they may be identified in terms of the x and y of coordinates of the pixel array.

A typical vidicon tube or CCD as would be used in measurement methods according to the invention gives a 512×512 pixel image. Thus a measurement point can be identified as being, say, at a point which is 100 pixels along the x-axis and 150 pixels on the y-axis. A problem arises, however, in that the array is not square but rectangular with, in a typical arrangement, the width of the rectangular "window" equal to one and one third times its height. The spacing between pixels is larger in the horizontal direction (the x-direction) by a factor 1.33 compared to the vertical direction (the y-direction). Thus the length of a line as determined by counting pixels and making Pythagorean calculations from the x- and y- pixel counts will depend upon the orientation of the line. To convert the pixel count to actual line length, the Pythagorean calculations need to be modified to take account of this distortion.

Other distortions will arise, however, due to such causes as aberrations in the camera lens, distortion in the vidicon sensor tube, of which barrel distortion will usually be dominant, and misalignments of the viewing system, for example, camera tilt. These will in general mean that the "pixel length" of a line will represent different actual lengths on the article being measured depending on the position of the line in the image.

Whilst the first-mentioned distortion (unequal pixel spacing in x- and y- directions) might be common to all vidicon tubes or CCD devices of a type, the other "device" distortions (lens and tube distortions) may well vary from device to device and the alignment will almost certainly vary from one piece of measuring apparatus to another and even from time to time in a single such apparatus, especially if the arrangement is capable of adjustment.

According to the invention, such distortion can be corrected for by further modifying the Pythagorean calculations.

In an application for garment measurement, where the required accuracy of any single measurement was not high, namely +0.5 centimeter, an adequate correction was attainable using functions of the form $$x = \cos([x'+a] \times \pi \times c/180) + b$$

$$y = (p \times y') + q$$

where the constants a, b, c, p and q are determined experimentally during a calibration procedure ("p" is, of course, the correction factor for the unequal x- and y-direction pixel spacing).

Where the apparatus is adjusted betwen measurements the constants, or some of them, will have to be re-determined.

The calibration may be carried out with reference to a scale associated with the field of view of the imaging device and this will also give a scale factor by which the modified pixel length derived from the algorithm is converted into an actual centimeter length of the article being measured.

The article may be laid out on a table in the field of view of the imaging device, which may be supported above the table so as to look down at the table top. The table may be backlit, as by comprising a translucent surface with e.g. fluorescent tubes beneath arranged so as to give substantially even illumination.

The table top can have the scale incorporated as for example a grid, for calibration, especially if the imaging device is relatively adjustable.

In the case of textile articles such as outergarments, the table top can be 1.6 meters by 1 meter in area. With a 512×512 pixel imaging device this gives a horizontal resolution of 0.3 cm which is just adequate for the measurements required in the shrinkage tests referred to above; interpolation techniques could be used to improve upon this and give sub-pixel accuracy if required.

The invention also comprises apparatus for measuring an article comprising
(a) an imaging device which forms a pixel image in an x-y array,
(b) point identifying means identifying measurement points on said pixel image in terms of x and y coordinates of said array, and
(c) data processing means programmed to evaluate actual lengths between identified measurement points on said article by carrying out appropriate Pythagorean calculations based on said x and y coordinates and modified to correct for scale and system distortions.

The said data processing means may comprise a digital computer.

BRIEF DESCRIPTION OF THE DRAWINGS

One embodiment of apparatus and a method for measuring articles will now be described with reference to the accompanying drawings, in which.

DETAILED DISCLOSURE OF THE PREFERRED EMBODIMENTS

Figure 1:
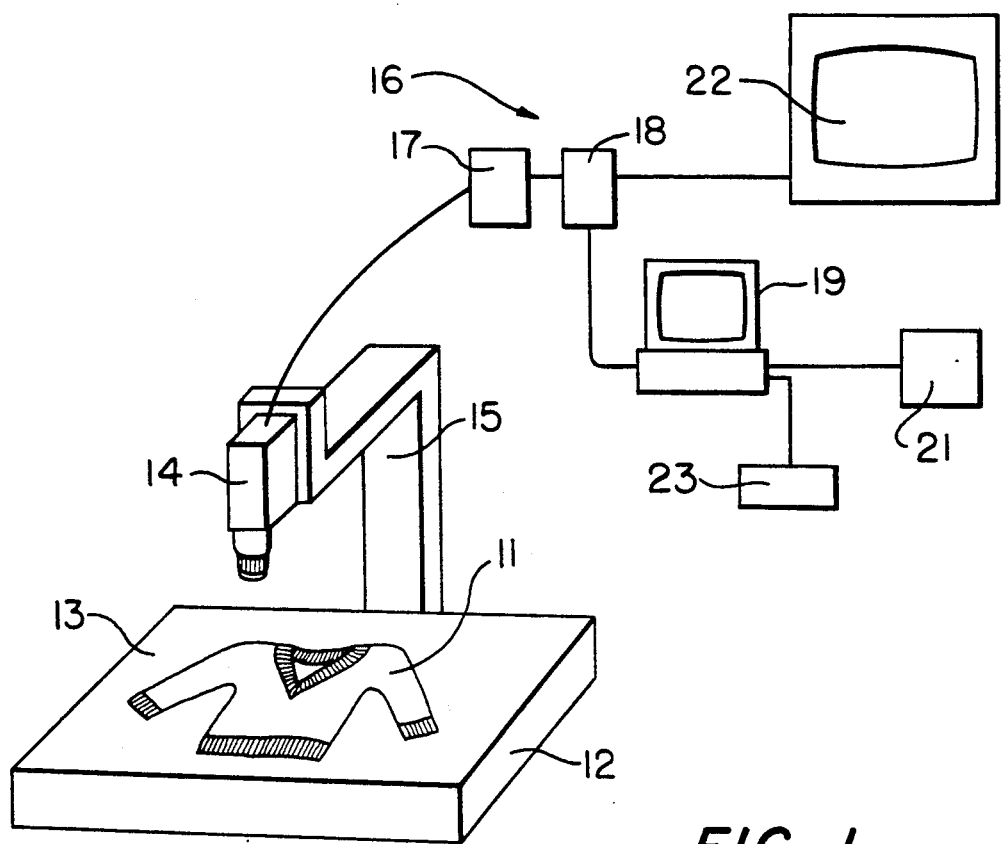
FIG. 1 is a perspective view of the apparatus.

The apparatus illustrated in the drawings is specially constructed for measuring garments such as the pullover 11. The garments are laid out in turn on top of a lightbox 12 which comprises a translucent table top 13 illuminated from beneath by fluorescent tubes (not shown). The top 13 measures 1.6 meters by 1 meter, this being adequate for most upper body garments measurements.

One intended use of the apparatus is to automatically measure batches of garments for shrinkage testing, the garments being measured after successive laundering operations. The garments would be laid out individually on the table top 13 and measured by the apparatus; the results of the measurements would be displayed during the measurement and stored in a database for analysis.

It will be appreciated that whilst with reasonable care successive garments can be reasonably accurately arranged in similar positions on the table top, nevertheless, the idea being to carry out the measurements quickly and efficiently, precise positioning cannot be prescribed, and in practice the garments will be placed in different positions and with different alignments.

The top 13 constitutes the field of view of an imaging device 14, which can be for example a vidicon tube or a charge coupled device (CCD) camera. The device 14 is mounted on a gantry 15 so as to be 1.8 meters above the table top 13. A C-mount lens of 8.5 mm focal length then gives an adequate field of view.

The device 14 is connected by a suitable cable to an image analysis arrangement 16 which includes a framegrabber 17 and framestore 18 holding an image 512×512 pixels, with 8 bits per pixel. A digital computer 19 is arranged to control the operation and has an associated database 21 and a display screen 22. A printer 23 can be arranged to print out results and, optionally, hard copy of images.

With mains-driven fluorescent tubes in the lightbox 12 and mains-synchronised framegrabbing, there is found to be no problem with flicker.

The method for measuring the article 11 comprises first arranging the article for measurement on the table top 12, that is to say in the field of view of the imaging device 14, and forming a pixel image thereof in the 512×512 pixel array. A frame is grabbed and stored. If desired, to eliminate undue noise effects, several frames may be averaged, the average being stored.

The grabbed frame is displayed on the display screen 22.

The method includes identifying measurement points on the pixel image in terms of x and y coordinates of the array. First, however, the measurement points have to be specified.

Two kinds of measurement point are important, namely those which are on the edges or at corners of the article, and those which are "internal". Where the article is backlit, the image is to all intents and purposes a silhouette. The face of the garment could be illuminated to show up differences in surface texture as between a plain and a rib section for instance, and image analysis techniques used to automatically specify internal measurement points from such features. However, high resolution would be required and the computation involved would be expensive in terms of time and otherwise. Simpler ways of identifying internal points are recommended.

Figure 2:
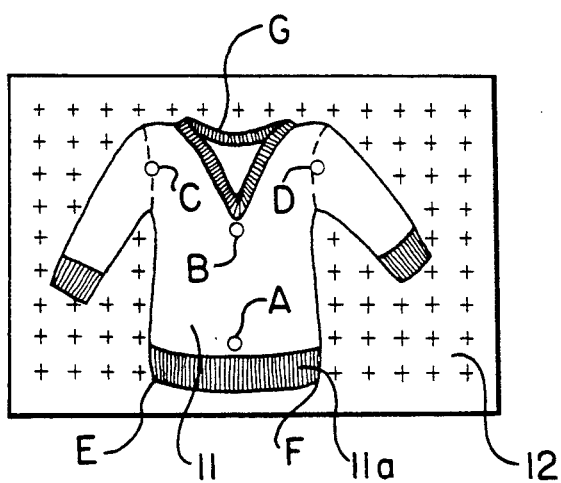
FIG. 2 is a plan view of a table with a garment to be measured laid out on it.

One is illustrated in FIG. 2, which shows a V-neck pullover 11 laid out for measurement on the table top 13. Here, four internal measurement points A, B, C and D are indicated, marked by small incandescent light bulbs placed on the garment by an operator. The bulbs can be located by e.g. pins or "VELCRO" (RTM) tabs (not shown), and are connected to a suitable source of current by wires, all of which detail is omitted for clarity's sake. Instead of bulbs, small reflectors such as sequins or perhaps spots of totally internally reflective microbead-containing paint can be arranged together with an overhead light so as to stand out prominently against the background of the garment 11.

The internal points are selected with reference to the measurements desired to be made. One important measurement in quality control or shrinkage measurement might be the depth of a rib section 11a of the garment, and thus one measurement point "A" is selected at the middle of the upper limit of the rib section 11a. Another, "B", is the apex of the V-neck, and points "C" and "D" are mid-points on the sleeve seams.

The computer 19 is programmed to "expect" "white" pixels in these general locations and identify the white pixel locations. The digitalised image will, of course, comprise a 512×512 array of binary numbers, the numbers beeing between 00000000 and 11111111 according to the light level of the pixel concerned. The program analyses the array to detect where in the expected region, the white pixel (or the central white pixel of the group) is located. The point concerned is then identified as the x and y coordinates of that pixel.

Whilst such a technique could be used for identifying corners, edge centers and other salient points of the garment, the idea of course is to automate the operation so far as reasonably possible and corner and edge features can be automatically identified by automatic analysis of the image.

Standard corner detection techniques could be used which might involve the use of masks of standard corner shapes which can be compared with the image to find when the mask coincides with a portion of the image, which is thus identified as a corner. Another technique is described in Davies, E. R. (1986) "Corner Detection using the Generalised Hough Transform" Proc. 2nd IEE Conf. on Image Processing, IEE Conf. Pub. No. 265 pp. 175-179.

However, a preferred technique for garment measurement depends upon the fact that garments have certain characteristics. For example, apertures for neck and arms are always present in upper-body garments, though differences in style (e.g. long sleeves, short sleeves, no sleeves, V-neck, crew neck, roll neck and so on) must be taken into account. Also, although garments cannot be positioned manually with perfect accuracy and repeatability, they can, for example, always be arranged such that the base is parallel say to with plus or minus 10 degrees to a particular edge of the table top and with the centroid of the shape within say 10 cm of the centroid of the field of view. This contextual information can be exploited to locate corners with minimal disturbance from noise.

First, the coordinates $(x_i, y_i)$ of all the points which lie on the edges of the silhouette are identified by a standard edge detection technique. Then the centroid $(x(o), y(o))$ is computed using the expressions $$x(o) = \frac{1}{n} \sum_{1}^{n} x_i$$

$$y(o) = \frac{1}{n} \sum_{1}^{n} y_i$$

or some convenient simplification of this method to reduce computation time.

Figure 3:
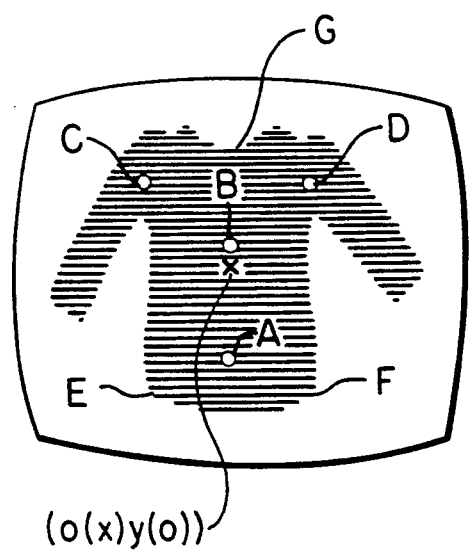
FIG. 3 is a view of a video screen display during the measurement.

Points E and F (see FIGS. 2 and 3) are the furthest points in the garment from the centroid $(x(o), y(o))$, within a certain range of y-values. Starting from the centroid, the vertical containing the centroid is scanned downwards until the bottom edge of the garment is encountered. A test is made to ensure that the point "A" is not mistaken for this intersection, as by scanning further downwards to see if further black pixels are encountered, or by checking the coordinates against those already established for the point "A".

To find the point E, a range of y-values on either side of the intersection just found is considered, to allow for the garment being misaligned. Starting at the top row in this range, and at or near the left hand edge of the frame, each pixel in the row is examined until a black one is found. The distance from this pixel to the centroid is calculated and stored.

The next row down is then examined in the same way and, if the centroid distance is greater than the one already stored, this is stored as the new distance. The procedure is repeated until the new centroid distance is not greater than the previous one, indicating that the corner has just been turned. The previous values of x and y are the coordinates of the point E. Point F is found in similar fashion.

Point G at the neck is found by examining pixels starting at a level somewhat above the centroid and to the left. Pixels are read vertically upwards until a white pixel is found; its y-value is stored. The next column of pixels is examined in the same way; if the y-value of the first white pixel is less than the stored y-value, this new y-value is substituted and the x-value again incremented to read the next column. If two consecutive y-values are equal, the following test is carried out to determine the nature of the point:

Points ten pixels to the right of the last encountered white pixel are read. If no white pixel is found, the point is not a corner point of the neck and must be a "flat" along the edge of the sleeve. If, however, a white pixel is found, then the required point has been located, since it is certain that there are white pixels along the top of the garment.

It is necessary to take a band of y-values in which to search for a pixel in this case since the garment may be slightly misorientated.

Other points on the garment edges are found by other techniques which will, from the foregoing examples, be readily worked out having regard to the nature of the point in question. Obviously the detection of all possible points cannot be described in a single document; rather the above examples illustrate the general approach to simple and efficient point detection, which approach must be adapted to the nature of the point being detected.

Moreover, although the technique has been specifically described with reference to garment measurement, other articles which may or may not have the same kind of outline features can be measured by the technique, suitably adapted by the appropriate specification of measuring points and the appropriate techniques for locating the same.

When all specified points have been detected, one has a collection of pixel coordinates $x_i, y_i$. The required measurements are now to be evaluated between pairs $(x_a, y_a), (x_b, y_b)$ of points, some of which may be derived from the specified points (e.g. points half-way or one third the way between two specified points).

The simple approach to this is to use the Pythagorean formula $$L^2 = (x_a - x_b)^2 + (y_a - y_b)^2$$

where L is the required length between the points $(x_a, y_a)$ and $(x_b, y_b)$.

This, however, is in pixels and takes no account of the distortion inherent in the array configuration of lens, tube and alignment distortions, or of scale.

Unequal spacing of the pixels in the x and y directions e.g. in a vidicon tube where the horizontal spacing is 4/3 times the vertical spacing, is dealt with by a simple linear transformation, namely:

$$y = py'$$

where y is the corrected value of the actual pixel coordinate y' and p is the transformation factor.

However, in practice, the other distortions are found to have an effect which cannot be ignored even with the relatively coarse tolerances (±0.5 cm) permitted in the shrinkage tests referred to above.

While the remaining distortions could be dealt with individually, it is preferred to apply a correction algorithm in which the true position coordinates x,y of a measurement point whose measured coordinates are x',y' is given by a polynomial relationship of the form:

$$x = f_1(x') \text{ and } y = f_2(y')$$

Adequate correction in the case of the garment measurements described for use in shrinkage testing was found to be attainable using functions of the form:

$$x = \cos((x' + a) \times \pi \times c / 180) + b$$

$$y = (p \times y') + q$$

The coefficients a, b and c are determined experimentally; in the particular set-up described above, a was found to be 50, b, 51.5 and c, 1.1. Of course, if the same arrangement were to be set up using a different camera or the same camera after an adjustment, these figures would be different, but they illustrate the orders of the magnitude of the parameters.

Calibration could, of course, be carried out by laying a ruler or scale on the tube top 13; but the table top 13 can be marked out with a grid as illustrated in FIG. 2 and this grid can be used to effect the initial calibration, which can in fact be executed quite automatically by the computer 19 identifying the pixels corresponding to the grid intersections and solving a set of simultaneous equations to establish the calibration parameters.

Because garments vary considerably in style, manageable programs will only cover a proportion and a selection of programs will be provided to cover all or most eventualities.

While the lightbulb method for specifying internal measurement points works well in practice, it is sometimes awkard to use on account of the wires tangling. Interactive insertion of internal measurement points on the monitor screen by a light pen or a tracker ball or mouse is an alternative technique—the garment would, during this operation, be top lit for the operator to see the surface features by which the points are selected.

As an alternative to the frame grabbing and frame store approach, which is expensive in terms of equipment and computing time, the image may be regarded as a silhouette which may be specified completely, uniquely and economically by its outline, an encoded description of the garment boundary can be held in the computer's regular random access memory.

The method is, of course, not restricted to the measurement of clothing whether for shrinkage measurements or any other reason; nor is it restricted to the measurement of flexible articles, although it is particularly adapted to such measurements being tolerant to flexure of the articles in addition to a degree of movement and twisting within the field of view. The method might be found useful in the measurement of items not susceptible to conventional measurement techniques such as in biological and microbiological measurements.

I claim:

1. A method for measuring lengths on a flexible textile article with the aid of data processing means including a digital computer, comprising the steps of
   (a) arranging the article flat on a table for measurement in a field of view of an imaging device which forms a pixel image in an x-y array,
   (b) forming by said imaging device a pixel image of the so-arranged article,
   (c) identifying measurement points on said pixel image in terms of x and y coordinates of said array,
   (d) using said digital computer for applying corrections algorithms to the x and y coordinates thus identified to yield new x and y coordinates corrected for scale and system distortions, and
   (e) further using said digital computer for evaluating actual lengths between identified measurement points on said article by carrying out appropriate Pythagorean calculations based on said new, corrected x and y coordinates.

2. A method according to claim 1, in which the said imaging device comprises a video camera or two-dimensional charge coupled device.

3. A method according to claim 1, in which the imaging device produces successive images of "frames" and image capture or frame grabbing and framestore devices are used to capture and store one of said successive images.

4. A method according to claim 3, in which the image is digitised for computing purposes.

5. A method according to claim 1, in which the pixel image is a silhouette image.

6. A method according to claim 5, in which an encoded description of the edge of the silhouette image is derived directly from the imaging device and stored in random access memory of a computer programmed to carry out the said Pythagorean calcuations.

7. A method according to claim 1, in which measurement points are identified automatically with respect to features of the image.

8. A method according to claim 7, in which said features include the centroid of the image.

9. A method according to claim 7, in which said features include edges of the image.

10. A method according to claim 7, in which said features include corners of the image.

11. A method according to claim 1, in which measurement points are identified by marking the article.

12. A method according to claim 11, in which the article is marked by point light sources placed on it prior to forming said pixel image.

13. A method according to claim 12, in which said point light sources comprise incandescent filament bulbs.

14. A method according to claim 12, in which said point light sources comprise reflectors.

15. A method according to claim 1, in which measurement points are identified by indicating their positions on the image.

16. A method according to claim 15, in which the measurement points are identified by light pen means.

17. A method according to claim 15, in which the measurement points are identified by tracker ball or "mouse" means.

18. A method according to claim 1, in which the Pythagorean calculations are modified to correct for different pixel spacings in the x and y directions.

19. A method according to claim 1, in which the Pythagorean calculations are modified by a correction algorithm determined by calibration.

20. A method according to claim 19, in which the correction algorithm is of the form:

$$x = \cos((x'+a) \times \pi \times c/180) + b$$

$$y = (p \times y') + q$$

where a, b, c, p and q are coefficients determined experimentally.

21. A method according to claim 19, in which the calibration is carried out with reference to a scale associated with the field of view of the imaging device.

22. A method for measuring lengths on a flexible article which can be laid flat, said method comprising the steps of
  (a) arranging the article for measurement on a table in a field of view of an imaging device which forms a pixel image in an x-y array,
  (b) with the table backlit forming by said imaging device a pixel image of the so arranged article,
  (c) identifying measurement points by marking the article on said pixel image in terms of x and y coordinates of said array,
  (d) applying correction algorithms to the x and y coordinates thus identified to yield new x and y coordinates corrected for scale and system distortions, and
  (e) evaluating actual lengths between identified measurement points on said article by carrying out appropriate Pythagorean calculations based on said new, corrected x and y coordinates.

* * * * *